United States Patent [19]

Matsumoto et al.

[11] Patent Number: 4,979,057
[45] Date of Patent: Dec. 18, 1990

[54] AUTOMATIC CASSETTE LOADING AND REPRODUCING APPARATUS

[75] Inventors: Akihiko Matsumoto; Fumihiro Nagasawa; Kuniharu Onozuka, all of Kanagawa, Japan

[73] Assignee: Sony Corporation, Tokyo, Japan

[21] Appl. No.: 378,754

[22] Filed: Jul. 12, 1989

[30] Foreign Application Priority Data

Jul. 15, 1988 [JP] Japan ................................ 63-175059

[51] Int. Cl.⁵ ........................ G11B 15/18; G11B 19/02
[52] U.S. Cl. ........................................ 360/71; 360/69
[58] Field of Search ............................ 360/69, 71, 92

[56] References Cited

U.S. PATENT DOCUMENTS

4,644,425 2/1987 Tamaki .................................. 360/69
4,782,401 11/1988 Faeber et al. ..................... 360/71 X
4,802,035 1/1989 Ohtsuka ............................ 360/71 X

*Primary Examiner*—John H. Wolff
*Attorney, Agent, or Firm*—Alvin Sinderbrand

[57] ABSTRACT

An automatic cassette loading and reproducing apparatus has main storage bins for storing recorded cassettes for normal use, for example, recorded with regularly scheduled news stories or commercials to be broadcast, auxiliary storage bins for receiving at least one recorded cassette for emergency use, for example, recorded with a late-breaking news story, a cassette transporter for selectively transporting recorded cassettes for normal use and emergency use between the respective storage bins and cassette reproducing devices, such as, VTRs, and a control device, for example, a micro-computer, for controlling the cassette reproducing devices and transporter and being programmed for a normal mode in which the recorded cassettes for normal use are reproduced in a predetermined sequence established in accordance with coded indications on the respective cassettes and an emergency mode in response to mere placement of a cassette for emergency use in one of the auxiliary storage bins, and in which the predetermined sequence of reproducing the cassettes for normal use is interrupted or suspended and reproducing of a cassette for emergency use proceeds instead.

16 Claims, 5 Drawing Sheets

| ON AIR NUMBER | START TIME | I D | DURATION | BIN NUMBER | VTR NUMBER |
|---|---|---|---|---|---|
| 31 | 00:00:00 | 001 | 00:10 | 3 | 1 |
| 32 |  | 002 | 00:10 | 4 | 2 |
| 33 |  | 003 | 00:10 | 5 | 3 |
| 34 |  | 005 | 00:15 | 6 | 4 |
| 35 |  | 007 | 00:20 | 7 | 1 |
| 36 |  | 008 | 00:10 | 9 | 2 |
| 37 | 00:01:00 | 015 | 00:15 | 21 | 3 |
| 38 |  | 012 | 00:10 | 23 | 4 |
| 39 | 00:01:55 | 009 | 00:10 | 14 | 1 |
| 40 |  | 016 | 00:30 | 15 | 2 |

AUTOMATIC CASSETTE LOADING AND REPRODUCING APPARATUS

BACKGROUND OF THE INVENTION

1. Field of the Invention

This invention relates generally to an automatic cassette loading and reproducing apparatus, and more particularly is directed to such apparatus for automatically loading and reproducing selected cassette tapes used in television broadcasting and the like, and which is hereinafter referred to as a "CART" machine.

2. Description of the Prior Art

Automatic cassette loading and reproducing apparatus of the kind referred to as "CART" machines are well known, for example, as disclosed in detail in U.S. Pat. No. 4,644,425, which has a common assignee herewith.

In such known automatic cassette loading and reproducing apparatus, a cassette storage rack is comprised of a substantial number of storage bins for receiving and storing video tape cassettes which are prerecorded with respective news stories or segments or with commercials, each being of relatively short duration. The known apparatus is further provided with a number of video tape reproducing devices (VTRs), and with a cassette transporter by which tape cassettes can be selectively removed from bins in which they are stored and then loaded into a selected VTRs. The housings of the tape cassettes are provided with bar codes or other similar coded information identifying at least the recorded contents of the respective tape cassettes, the numbers of the bins in Which the tape cassettes are stored, and the order in which the several tape cassettes stored in the bins of the rack are to be reproduced for broadcasting or transmission. Further, the coded information on each tape cassette housing may identify the one of the VTRs by which that tape cassette is to be reproduced, the starting time for reproduction of the recorded contents, and the duration of the recorded contents.

In the normal operation of the described known "CART" machine, the placement of a tape cassette into a bin of the storage rack is detected by a sensor in such bin, and the resulting signal causes a system controller, for example, in the form of a micro-computer, to cause the cassette transporter to move to a position aligned with the respective storage bin. Thereupon, the tape cassette is removed from its bin and inserted into the cassette transporter where the coded information on the cassette housing is read, for example, by a bar code reader, and stored in a memory of the system controller. Thereupon, the tape cassette is returned from the cassette transporter to the respective bin of the storage rack.

The video segment or recorded contents to be reproduced from each tape cassette and then broadcast is hereinafter referred to as an "event" and, after all of the tape cassettes have been placed in the respective bins and have had the respective coded information or event data read therefrom by the bar code reader and stored in the memory of the system controller, such event data stored in the memory are checked against an earlier prepared or generated event list which is suitable input to the system controller. The event list indicates the order in which the several tape cassettes are to be reproduced and transmitted or be "on the air", the identification numbers of the several tape cassettes, the titles of the respective events or recorded contents, the durations and broadcast times of the events, the numbers of the bins in which the tape cassettes are respectively stored, the identification numbers of the VTRs by which the tape cassettes are to be respectively reproduced, and the identification of the channels through which the reproduced contents or events are to be transmitted. After checking the event data in the memory against the event list, a number of the tape cassettes at the beginning of the predetermined sequence or order in which the cassettes are to be reproduced are loaded into the respective VTRs which are placed in their standby state so that, upon a signal from the operator, the system controller initiates successive reproducing operations of the VTRs in the predetermined sequence or order given on the event list. Immediately after a first event or news segment has been completely reproduced from a tape cassette by the VTR in which that cassette is loaded, the system controller initiates reproducing operation of another VTR which has been in its standby state so as to cause reproduction and transmission of the next event or news segment. Thus, continuous reproduction of the successive events is achieved so as to permit uninterrupted transmission or broadcast of the previously determined program corresponding to the event list. As the reproduction of each tape cassette is completed, the tape cassette is returned by the transporter to its respective bin and the transporter then loads into the vacated VTR another tape cassette which the event list indicates follows in the predetermined order of reproduction of the tape cassettes the group of cassettes first loaded into the VTRs.

Although the above described existing "CART" machine makes possible the automatic and accurate selective loading of the tape cassettes into the several VTRs and the reproducing operation of the latter so as achieve the continuous reproducing and transmission or broadcast of the recorded events or news segments in a predetermined sequence, such known "CART" machine has some disadvantageous characteristics. In this respect, it is to be noted that, in order to achieve the automatic and selective reproducing of the contents of the several stored tape cassettes, it is necessary to initially prepare an event list containing the previously described information for each of the tape cassettes, and also to provide each of the tape cassettes with a bar code or the like representing corresponding coded information. Since the foregoing is time consuming, the preparation of the event list and the application of the bar codes to the housings of the several tape cassettes have to be performed well in advance of "air time", that is, in advance of the actual reproduction and broadcast of the recorded contents of the selected tape cassettes.

Therefore, the known "CART" machine has not been suited for the reproduction and broadcast of a tape cassette which has not been included in the originally prepared event list, for example, which is recorded with video related to a late-breaking story or news flash, and which it is desired to interpose, without delay, in the previously prepared order or sequence of the tape cassettes dictated by the event list. In the case of the "CART" machine according to the prior art, it is necessary to provide on the housing of a tape cassette intended for emergency use, that is, recorded with video related to a late-breaking story or the like, a bar code representing the respective coded information, and then to effect correction or amendment of the event list for including therein, at the desired position in the predetermined sequence of reproduction, the information concerning the tape cassette for emergency use. The time required for performing the foregoing operations in respect to the tape cassette for emergency use is undesirable and frequently not available, for example, when the tape cassette recorded with video relating to a late-breaking story of great importance is only received in the studio near the end of the scheduled news program.

OBJECTS AND SUMMARY OF THE INVENTION

Accordingly, it is an object of the present invention to provide an automatic cassette loading and reproducing apparatus of the type referred to above as a "CART" machine, and which avoids the mentioned disadvantages of the prior art.

More specifically, it is an object of this invention to provide an automatic cassette loading and reproducing apparatus by which recorded cassettes for normal use are reproduced in a predetermined sequence, for example, in accordance with coded indications on the respective cassettes and corresponding to a previously prepared event list, and such reproduction according to the event list is readily suspended and replaced by reproducing of a cassette for emergency use, that is, a cassette recorded with video related to a late-breaking news story or news flash.

In accordance with an aspect of this invention, an automatic cassette loading and reproducing apparatus has main storage means for storing a plurality of recorded cassettes for normal use; cassette reproducing means, desirably constituted by a plurality of VTRs; auxiliary storage means for storing at least one recorded cassette for emergency use; cassette transporting means for selectively transporting the recorded cassettes between the main and auxiliary storage means and the cassette reproducing means; and control means for controlling the cassette reproducing means and the cassette transporting means and being programmed for a normal mode in which the cassette reproducing means reproduces the plurality of recorded cassettes for normal use in a predetermined sequence, and an emergency mode which is established upon the placement of a recorded cassette for emergency use in the auxiliary storage means and in which the predetermined sequence of reproduction of the cassettes for normal use is interrupted or suspended and at least one recorded cassette for emergency use is reproduced by the cassette reproducing means.

In a preferred embodiment of this invention, the auxiliary storage means includes a plurality of storage bins each adapted to receive and store a respective recorded cassette for emergency use, and each of such storage bins includes a respective sensing means for detecting the presence of a recorded cassette for emergency use in the respective storage bin, whereupon, the control means responds to the detecting by the sensing means of the presence of a recorded cassette for emergency use in the respective storage bin so as to change-over from the normal mode to the emergency mode and thereby interrupt the reproducing of the recorded cassettes for normal use in the predetermined sequence.

The above, and other objects, features and advantages of the invention, will be apparent in the following detailed description when read in connection with the accompanying drawings in which corresponding parts and components are identified by the same reference numerals in the several views.

DETAILED DESCRIPTION OF A PREFERRED EMBODIMENT

Before proceeding with a detailed description of a preferred embodiment of the invention, reference will be made to FIGS. 1-3 in describing a "CART" machine according to the prior art so that the disadvantages of such machine and the problems solved by the present invention will be well understood.

Figure 1:
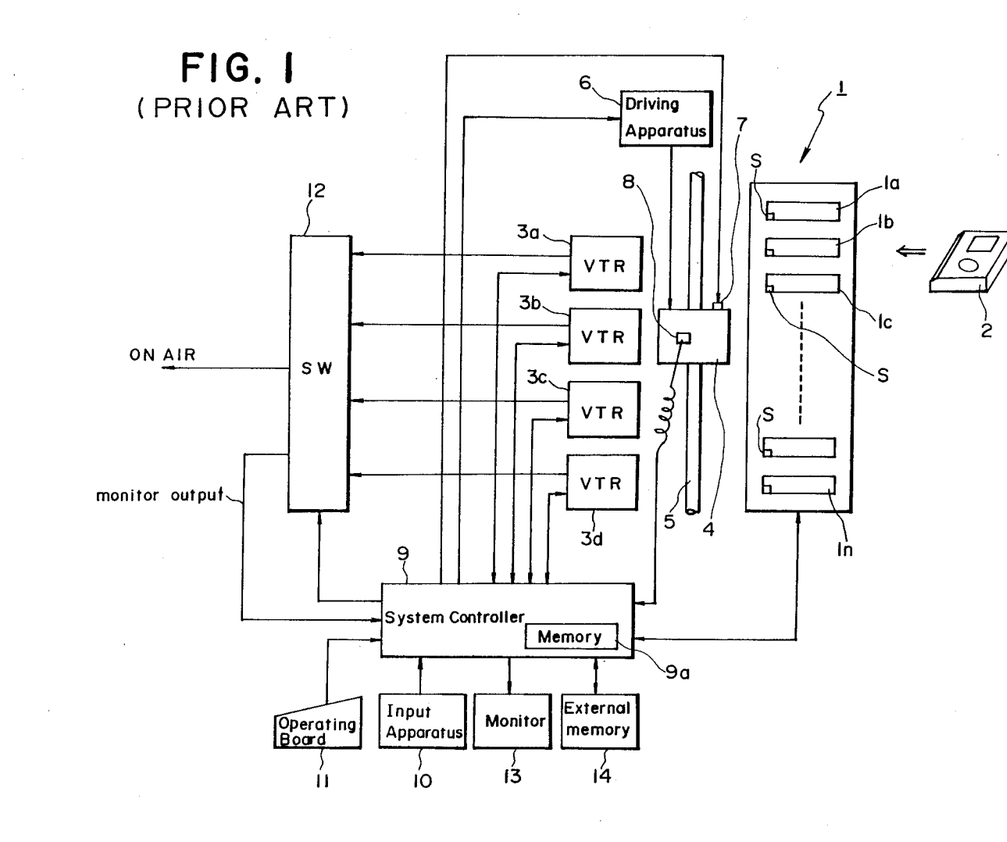
FIG. 1 is a schematic block diagram illustrating an automatic cassette loading and reproducing apparatus or "CART" machine according to the prior art.

As shown on FIG. 1, a "CART" machine according to the prior art generally comprises a cassette storage rack 1 having numerous storage bins of which one vertically arranged set of bins is indicated at 1a, 1b, 1c, --- 1n, with each of such storage bins being adapted to receive and store a video tape cassette 2. Each of the bins 1a-1n is provided with a suitable sensor S for detecting the presence in the respective bin of a tape cassette 2.

The "CART" machine of FIG. 1 is further shown to comprise four video tape reproducing devices or VTRs 3a, 3b, 3c and 3d, and a cassette transporter 4 by which a tape cassette 2 is removed from a selected one of the bins 1a-1n and then suitably transported and loaded into a selected one of the VTRs 3a-3d. The transporter 4 is suitably driven along a guide 5 by a drive apparatus 6 so as to be selectively aligned with any one of the cassette storage bins 1a-1n and/or any one of the VTRs 3a-3d. The cassette transporter 4 is provided with an actuator (not shown) which is selectively operative for transferring a tape cassette 2 between one of the bins 1a-1n and the transporter 4, and/or between the transporter 4 and a selected one of the VTRs 3a-3d, and a motor 7 for driving such actuator is schematically illustrated on the transporter 4.

Figure 2:
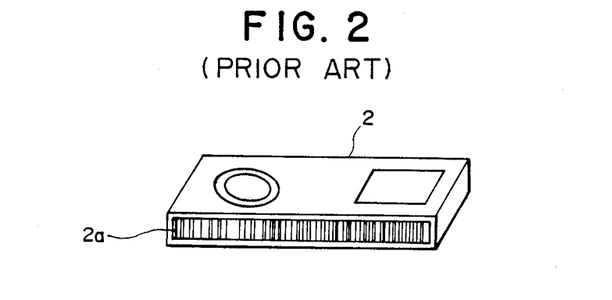
FIG. 2 is a perspective view showing a tape cassette intended for use in the "CART" machine according to the prior art.

Each tape cassette 2 is shown on FIG. 2 to be provided, on the rear face of its housing, with coded information, for example, in the form of a bar code 2a, identifying at least the event recorded in the respective tape cassette, an identifying, number of the bin 1a-1n in which the tape cassette is stored, and an "on air" number representing the order in which each of the several tape cassettes stored in the bins is to be reproduced for broadcasting or transmission. Further, the bar code 2a on each tape cassette housing may identify the one of the VTRs 3a-3d by which that tape cassette is to be reproduced, the starting time for the reproduction of the respective event or recorded contents, and the duration of such recorded event. At the interior of the cassette transporter 4 there is provided a sensor 8, for example, in the form of a bar code reader, for reading the bar code 2a on each of the cassettes 2 as the latter is inserted into and removed from the transporter 4.

The "CART" machine of FIG. 1 is further shown to comprise a system controller 9, for example, constituted by a micro-computer, having a memory 9a and being supplied with a prepared event list through an input apparatus 10 for performing various control operations, as hereinafter described, in accordance with such event list. Further, an operating panel 11 is connected with the system controller 9 and is operable by the operator of the "CART" machine for regulating, at will, certain functions of the machine. A switching device 12 receives the reproduced outputs from the VTRs 3a-3d and is operable by the system controller 9 for selecting one of the reproduced signals from the VTRs 3a-3d as the output to be broadcast or transmitted. A monitor 13 is connected with the system controller 9 for displaying the event list supplied to the controller through the input apparatus 10 and which may be stored in an external memory 14, for example, in the form of a floppy disk drive. The monitor 13 may be further operative to display the reproduced output of the one of the VTRs 3a-3d selected by the switching device 12 for broadcasting or transmission.

In the normal operation of the known "CART" machine shown in FIG. 1, the placement of a tape cassette 2 into one of the bins 1a-1n of the storage rack 1 is detected by the respective sensor S and the resulting signal causes the system controller 9 to effect, through the drive 6, the movement of the cassette transporter 4 to a position aligned with the respective storage bin. Thereupon, the drive motor 7 is operated for removing the tape cassette from its respective bin and inserting such tape cassette into the transporter 4. During such movement of the tape cassette into the transporter 4, the bar code 2a on the cassette housing is read by the bar code reader 8, and the resulting coded information or event data is supplied from the reader 8 to the memory 9a of the system controller 9 for storage in the latter. Thereupon, drive motor 7 is operated in a reverse direction for returning the tape cassette from the transporter 4 to the respective bin of the storage rack 1. During such return movement of the tape cassette, the bar code 2a is again sensed by the bar code reader 8 for confirming that the bar code then being read is the reverse of that read during the insertion of the tape cassette into the transporter 4 and thereby establishing the correctness of the respective event data, as read.

The above described operation for storing the coded information in the memory 9a is repeated each time a tape cassette 2 is inserted into a respective one of the bins 1a-1n. Therefore, upon the completion of the placement of the tape cassettes in succession in the respective bins of the storage rack 1, the memory 9a of the system controller 9 has stored therein coded information or event data identifying the bins in which the several tape cassettes are stored, and also identifying the events or news segments that are recorded in the respective tape cassettes.

Figure 3:
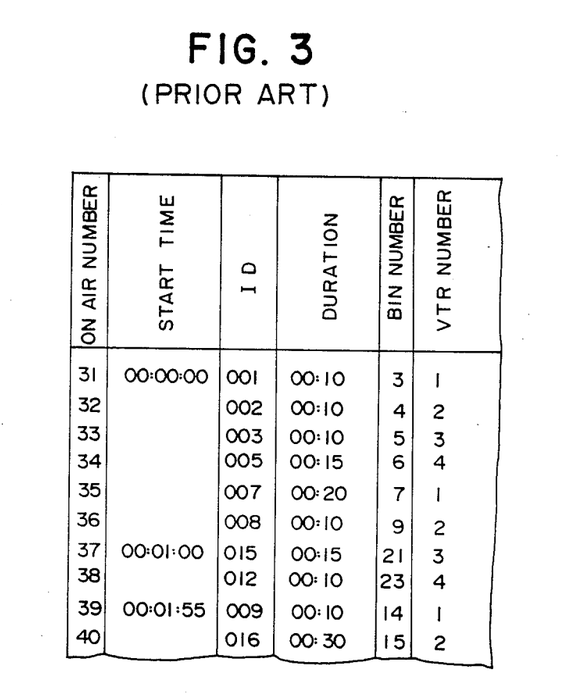
FIG. 3 is a schematic view of a portion of an event list that is prepared in advance for programming the operation of the "CART" machine according to the prior art.

As shown on FIG. 3, the event list which is usually earlier prepared and supplied through the input apparatus 10 to the system controller 9 for storage ultimately in the external memory 14 provides, for each tape cassette, an "on air number" which identifies the order in which the events recorded in the several tape cassettes are to be reproduced and broadcast or transmitted, starting times for such recording and reproducing, an ID number by which the recorded contents or event of the respective tape cassette can be identified, the duration of the recorded contents, the number of the bin of the storage rack 1 in which the tape cassette is to be stored, and a number identifying the one of the VTRs 3a-3d by which the respective tape cassette is to be reproduced.

Of course, when the several tape cassettes are being manually inserted into the storage rack 1, such manual insertion is effected in the order of the "on air numbers" given to the several tape cassettes by the event list shown on FIG. 3, and the several tape cassettes are inserted into the storage bins identified by the respective "bin numbers" on the event list. The data of the event list supplied to the system controller 9 through the input apparatus 10 are compared with the event data obtained for each tape cassette by the bar code reader 8 and stored in the memory 9a of the system controller for confirming that such event data corresponds to the related data of the event list, and hence that the several tape cassettes have been stored in the correct bins of the storage rack 1. If the event data stored in the memory 9a is determined to be correct as compared with the stored event list, the tape cassettes having the ID numbers 001, 002, 003 and 005 and in which there are recorded the first to fourth events, that is, corresponding to the "on air numbers" 31, 32, 33 and 34 in the event list of FIG. 3, are removed in succession from the bins identified by the "bin numbers" 3, 4, 5 and 6, respectively, and loaded by the transporter 4 into the VTRs 3a-3d identified by the VTR numbers 1, 2, 3 and 4, respectively, whereupon, the standby state of such VTRs is established.

Thereafter, when the operator suitably initiates the reproducing operation by actuating a respective push-button switch or the like at the operating panel 11, the system controller 9 responds thereto for causing the VTRs 3a-3d, which are identified by the VTR numbers 1, 2, 3 and 4 and are in the standby state, to be successively changed-over to the reproducing or operative state in which, for example, events recorded in the tape cassettes identified by the ID numbers 001, 002, 003 and 005 are reproduced and broadcast in succession. Immediately upon the completion of the reproducing and broadcasting of the event recorded in the tape cassette having the ID number 001, that is, having the "on air number" 31, the respective VTR identified by the VTR number 1 is rendered inoperative, and the VTR identified by the VTR number 2 is changed-over from its standby state to its operative state for commencing the reproducing and transmission of the second event identified by the "on air number" 32 and which is recorded in the tape cassette having the ID number 002. As soon as the reproducing of the tape cassette having the ID number 001 is completed, the transporter 4 returns that tape cassette to its respective bin identified as "bin number" 3 in the event list of FIG. 3. Furthermore, at that time, the transporter 4 removes from the bin identified by "bin number" 7 the tape cassette identified by the ID number 007, and loads the latter tape cassette into the VTR identified by the VTR number 1 which is then placed in its standby condition.

It will be appreciated that the above described operations of the known "CART" machine can be performed continuously or intermittently in response to the manipulation of suitable controls on the operating panel 11, or in response to the start times prescribed in the event list. Although the described existing "CART" machine makes possible the automatic and accurate selective loading of the tape cassettes into the several VTRs 3a–3d and the reproducing operation of the latter so as to achieve the continuous or intermittent reproducing and transmission or broadcast of the recorded events or news segments in a predetermined sequence, the known machine has some serious disadvantages. Thus, it will be appreciated that, in order to achieve the automatic and selective reproducing of the events or recorded contents of the several stored tape cassettes, it is necessary to initially prepare the event list shown on FIG. 3, and also to provide each of the tape cassettes with the bar code 2a or the like representing the corresponding coded information or event data. The preparation of the event list and of the bar codes for affixing to the housings of the tape cassettes is time consuming and, therefore, has to be performed in advance of "air time". Therefore, the known "CART" machine is not suited for the reproduction and broadcast of a tape cassette for emergency use which has not been included in the originally prepared event list, for example, which is recorded with video relating to a late-breaking story or news flash, and which it is desired to air without delay. In the case of the known "CART" machine, such reproduction and broadcast of an event not originally scheduled still requires that the respective tape cassette be provided with a bar code representing the respective event data, whereupon the tape cassette with such bar code thereon is inserted into one of the bins 1a–1n. Meanwhile, a correction or amendment has to be made in the event list which is again supplied through the input apparatus 10 to the system controller 9 so as to include in the stored event list all of the necessary information concerning the tape cassette for emergency use.

It will be appreciated that the time required for performing such preparatory operations in respect to the tape cassette for emergency use is undesirable and frequently not available, for example, when the tape cassette recorded with video relating to a late-breaking story or the like is only received in the studio near the end of the scheduled news program.

Figure 4:
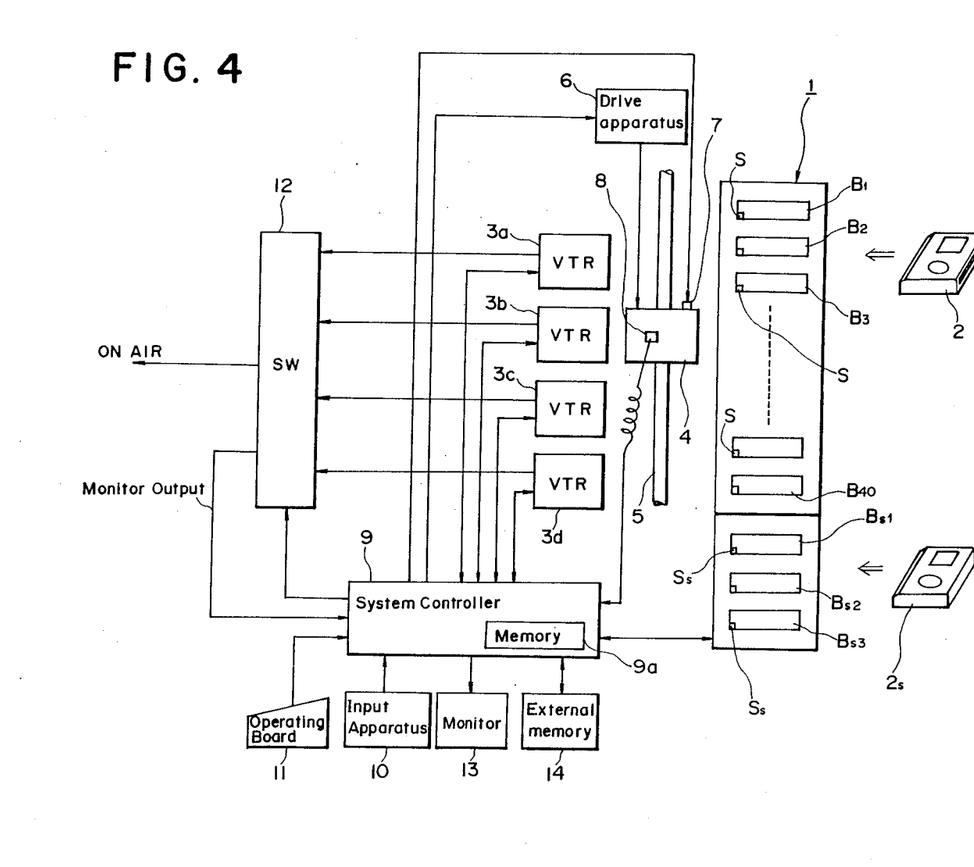
FIG. 4 is a schematic view similar to that of FIG. 1, but showing an automatic cassette loading and reproducing apparatus or "CART" machine according to an embodiment of the present invention.

Referring now to FIG. 4, it will be seen that, in a "CART" machine embodying the present invention and which avoids the foregoing disadvantages of the machine described with reference to FIG. 1, the cassette storage rack 1 comprises a main storage area made up of a relatively large number, for example, 40 bins $B_1$–$B_{40}$ for storing respective recorded cassettes 2 intended for normal use, and an auxiliary storage area made up of a lesser number of bins $B_{s1}$–$B_{s3}$ each adapted to receive and store a tape cassette $2_s$ for emergency use. Each of the bins $B_{s1}$–$B_{s3}$ is provided with a sensor $S_s$ for detecting the presence in the respective bin of a tape cassette $2_s$ for emergency use.

The remaining components of the "CART" machine according to the embodiment of this invention illustrated on FIG. 4 are identified by the same reference numerals identifying the corresponding components in FIG. 1.

Figure 5A:
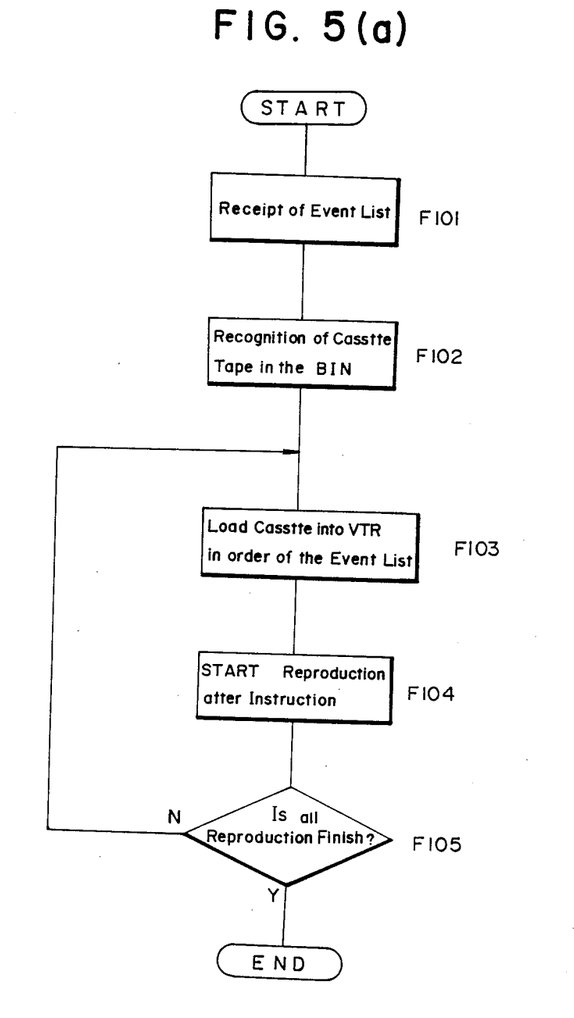
FIGS. 5(a) and 5(b) are flow charts illustrating operations of the apparatus of FIG. 4 in its normal and emergency modes, respectively.

The operation of the "CART" machine embodying this invention will now be described in detail with reference to the flow charts of FIGS. 5(a) and 5(b) which illustrate operations in a normal mode and in an emergency mode, respectively.

In the normal mode, that is, when the tape cassettes to be reproduced and broadcast by the "CART" machine have all been available in advance of the time for the airing of the scheduled program so that sufficient time was available for the prior preparation of the event list and the bar codes, such event list is supplied through the input apparatus 10 to the system controller 9 in the initial step F101. In the following step F102, the system controller 9 recognizes or identifies the bins $B_1$–$B_{40}$ in which there are stored tape cassettes recorded with the various events or news segments identified in the event list. Such recognition or identification of the events recorded in the tape cassettes stored in the several bins $B_1$–$B_{40}$ may be obtained, as described above with reference to the known "CART" machine of FIG. 1, by the bar code reader or sensor 8 situated in the transporter 4 and being operative to read the bar code on each of the tape cassettes 2 when the latter is initially placed in the respective one of the bins $B_1$–$B_{40}$, whereupon the resulting event data is stored together with the respective bin number in the memory 9a. Although the reading of the bar codes on the several cassettes 2 for normal use has been described as occurring after the system controller 9 has received the event list for storage in the memory 14, that order may be reversed. In other words, the reading of the bar codes on the several tape cassettes 2 for normal use by the bar code reader 8 and the return of such cassettes for normal use to the respective bins $B_1$–$B_{40}$ may be completed with the corresponding event data being stored in the memory 9a prior to the supplying of the event list through the input apparatus 10 to the system controller 9.

After the event list and the event data read from the bar codes on the several tape cassettes are suitably stored and checked against each other by the system controller 9, the tape cassettes 2 are loaded into the VTRs 3a–3d in the step F103 in the order in which such tape cassettes are to be reproduced and broadcast as indicated by the event list. Upon the receipt of a suitable instructing signal from the operating panel 11, the system controller 9 is operative, in the step F104, to initiate the reproducing and broadcasting of the recorded events or news segments in the order determined by the stored event list.

The operations described above in respect to steps F103 and F104 are repeated until it is determined, in step F105, that all of the tape cassettes appearing in the event list have been reproduced. Thus, the events or news segments recorded in the several tape cassettes for normal use are reproduced successively either continuously or intermittently, as determined by the event data provided in the event list and read from the bar codes, similarly to the operations earlier described for the "CART" machine according to the prior art.

Figure 5B:
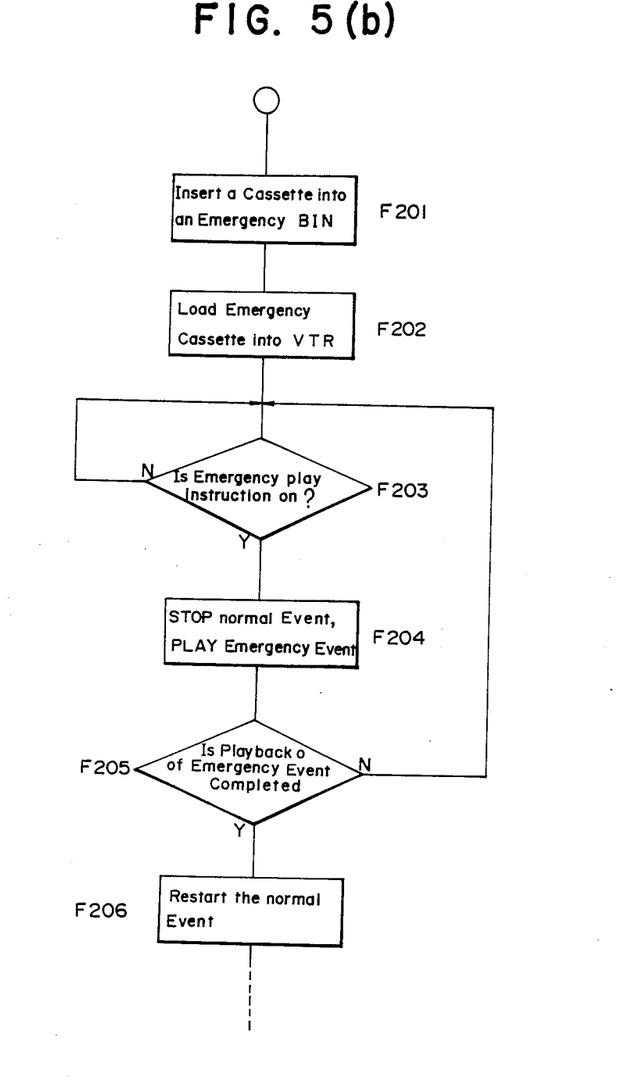

When it is necessary to reproduce and broadcast an event or news segment recorded on a tape cassette $2_s$ for emergency use, for example, a cassette that has become available only during the time of the broadcast, such tape cassette $2_s$ is simply inserted into one of the bins $B_{s1}$–$B_{s3}$ in the auxiliary storage area of the storage rack 1, and the operations of the "CART" machine according to the present invention then proceed as shown by the flow chart of FIG. 5(b).

More particularly, when a tape cassette $2_s$ for emergency use is inserted into one of the bins $B_{s1}$–$B_{s3}$ in the initial step F201, the respective sensor $S_s$ detects such insertion and transmits a corresponding signal to the system controller 9. In response to such signal supplied from a sensor $S_s$ to the system controller 9, the latter causes the transporter 4 to load the respective tape cassette $2_s$ into an empty one of the VTRs 3a–3d in the step F202. If none of the VTRs 3a–3d are empty or vacant, that is, if tape cassettes 2 for normal use are loaded into all of the VTRs 3a–3d at the time when a tape cassette $2_s$ for emergency use is inserted into one of the bins of the auxiliary storage area, the system controller 9 decides, on the basis of the event list, which of the tape cassettes 2 then loaded in one of the VTRs 3a–3d is to be temporarily unloaded therefrom so as to make room for the tape cassette $2_s$ to be loaded into a VTR. The tape cassette 2 for normal use which is to be unloaded from a VTR is selected or determined from the event list to be the last to be reproduced of the four tape cassettes for normal use then loaded in the VTRs 3a–3d.

After the tape cassette $2_s$ for emergency use has been loaded into one of the VTRs 3a–3d, that fact is confirmed, for example, by a suitable indication on the monitor 13 which further indicates or identifies the number of the VTR into which the tape cassette $2_s$ for emergency use has been loaded. Thereupon, the VTR into which the tape cassette for emergency use has been loaded has its standby state established.

Thereafter, when the operator perceives a suitable time relative to the event or news segment being normally reproduced from a cassette 2 included in the current event list, the operator actuates a suitable pushbutton switch or the like at the operating panel 11, as in step F203, thereby providing a signal for instructing the VTR having the tape cassette for emergency use loaded therein to commence the reproducing thereof. In response to such instructing signal, the system controller 9 changes-over the switching device 12 so that the reproduced signal from the tape cassette $2_s$ for emergency use is supplied therefrom as the output to be broadcast, while suspending, as in the step F204, the reproducing of the events recorded in the tape cassettes 2 for normal use in accordance with the previously prepared event list.

Although the change-over in step F204 from the reproduction of a cassette 2 for ordinary use to the reproduction of a cassette $2_s$ for emergency use has been described above as being effected in response to the operator's actuation of a pushbutton switch or the like at the operating panel 11, the changeover from reproduction of a cassette 2 for normal use to reproduction of a cassette $2_s$ for emergency use may be otherwise effected. Thus, for example, if the events or news segments recorded in the tape cassettes 2 for normal use are of short durations, such as, from about 10 seconds to 1 minute, the initiation of the reproduction and broadcasting of each event recorded in a cassette $2_s$ for emergency use may be effected automatically in response to the loading of such cassette $2_s$ into any one of the VTRs 3a–3d, and be timed to occur upon the conclusion of the event recorded in the cassette 2 for normal use from which that event was being reproduced at the time of the loading of a cassette $2_s$ for emergency use into one of the VTRs.

When the reproduction of an event recorded in a cassette $2_s$ for emergency use has been completed, that fact is determined in the step F205, and the normal mode is reestablished in the step F206, that is, the suspended reproducing of the cassettes 2 for normal use in accordance with the event list is restarted with the repetition of the operations of steps F103 and F104.

In the event that two tape cassettes $2_s$ for emergency use have been placed in the bins $B_{s1}$ and $B_{s2}$, the above described steps F203–F205 are repeated for the second cassette $2_s$ for emergency use after the reproduction of the first cassette $2_s$ for emergency use has been completed. In the case where a plurality of tape cassettes $2_s$ for emergency use are placed in the bins $B_{s1}$–$B_{s3}$ of the auxiliary storage rack, the times when these cassettes $2_s$ for emergency use are inserted into the respective bins, that is, when signals are generated by the respective cassette presence sensors $S_s$, and the numbers of the bins $B_{s1}$–$B_{s3}$ in which the cassettes $2_s$ are placed are stored in the memory 9a of the system controller 9. In other words, the order in which the cassettes $2_s$ for emergency use are placed in the respective bins $B_{s1}$–$B_{s3}$ is stored in the memory 9a, and the system controller 9 causes reproduction of the cassettes $2_s$ in that order during operations in the emergency mode.

It will be appreciated that, even if a cassette $2_s$ recorded with an event that urgently needs to be reproduced and broadcast is brought to the studio unexpectedly while normal reproducing operations are being performed on cassettes 2 for normal use by the VTRs 3a–3d according to a previously prepared event list, the "CART" machine embodying the present invention satisfies the requirement for reproducing and broadcasting of the cassette $2_s$ for emergency use merely by placing such cassette in one of the bins $B_{s1}$–$B_{s3}$ without the need for providing the cassette $2_s$ with a bar code identifying the event recorded therein, and further without the need for amending or changing the event list then in use. Therefore, the reproducing and broadcasting of a late-breaking news item or a news flash can be effected as soon as the cassette $2_s$ containing the same is received in the studio.

The advantages of the above arrangement in accordance with this invention are particularly desirable when applied to the production of news programs or the like in television broadcasting stations.

Although a specific embodiment of the invention has been described above with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An automatic cassette loading and reproducing apparatus comprising:

main storage means for storing a plurality of recorded cassettes for normal use;

cassette reproducing means;

auxiliary storage means for storing at least one recorded cassette for emergency use;

cassette transporting means for selectively transporting said recorded cassettes for normal use and emergency use between said main and auxiliary storage means and said cassette reproducing means; and control means for controlling said cassette reproducing means and said cassette transporting means and being programmed for a normal mode in which said cassette reproducing means reproduces said plurality of recorded cassettes for normal use in a predetermined sequence, and an emergency mode which is established upon the placement of a recorded cassette for emergency use in said auxiliary storage means and in which said predetermined sequence is interrupted and said at least one recorded cassette for emergency use is reproduced by said cassette reproducing means.

2. An automatic cassette loading and reproducing apparatus according to claim 1; in which said auxiliary storage means includes a plurality of storage bins each adapted to receive and store a respective recorded cassette for emergency use.

3. An automatic cassette loading and reproducing apparatus according to claim 2; in which each of said storage bins includes a respective sensing means for detecting the presence of a recorded cassette for emergency use in the respective storage bin.

4. An automatic cassette loading and reproducing apparatus according to claim 3; in which said control means responds to the detecting by said sensing means of the presence in said respective storage bin of a recorded cassette for emergency use so as to change-over from said normal mode to said emergency mode and thereby interrupt said predetermined sequence.

5. An automatic cassette loading and reproducing apparatus according to claim 1; in which said cassette reproducing means includes a plurality of cassette players each having a standby state in which a recorded cassette is loaded therein and made ready for the reproducing thereof and an operative state in which the recorded cassette previously loaded into the respective cassette player is reproduced by the latter; said control means is operative in said normal mode to cause said cassette transporting means to load recorded cassettes for normal use into said plurality of cassette players in said predetermined sequence and then to hold said cassette players in said standby state until said cassette players are switched to said operative state for reproducing recorded cassettes therein in said predetermined sequence; and said control means is operative in said emergency mode to remove from one of said cassette players the recorded cassette for normal use which is last, according to said predetermined sequence, among the recorded cassettes then loaded in said cassette players and to load said recorded cassette for emergency use in place of the removed cassette and establish said standby state of the respective cassette player.

6. An automatic cassette loading and reproducing apparatus according to claim 5; further comprising means operative at will to establish said operative state of said respective cassette player in which said recorded cassette for emergency use is loaded and to suspend operation of the cassette player loaded with the recorded cassette for normal use which is then at the head of said predetermined sequence.

7. An automatic cassette loading and reproducing apparatus according to claim 6; in which said auxiliary storage means includes a plurality of storage bins each adapted to have placed therein and store a respective recorded cassette for emergency use, and sensing means associated with each of said storage bins for detecting the presence of a recorded cassette for emergency use in the respective storage bin.

8. An automatic cassette loading and reproducing apparatus according to claim 7; in which said control means responds to the detecting by said sensing means of the presence in the respective storage bin of a recorded cassette for emergency use so as to change-over from said normal mode to said emergency mode, and the apparatus remains in said emergency mode until each said recorded cassette for emergency use has been reproduced, whereupon said control means returns to said normal mode at the point in said predetermined sequence where an interruption occurred in the reproducing of the recorded cassettes for normal use.

9. An automatic cassette loading and reproducing apparatus according to claim 8; in which, when a plurality of said recorded cassettes for emergency use are stored in said bins of the auxiliary storage means, said control means causes reproducing of said recorded cassettes for emergency use in the order in which said recorded cassettes for emergency use have been placed in the respective bins.

10. An automatic cassette loading and reproducing apparatus according to claim 1; in which each of said recorded cassettes for normal use has thereon coded indicating means providing coded information representing at least the placement in said predetermined sequence of the respective recorded cassette for normal use and the location in said main storage means where said respective recorded cassette for normal use is stored, said cassette transporting means includes reading means for reading said coded indicating means on each of said recorded cassettes for normal use, and said control means include memory means for storing said coded information and determines therefrom said predetermined sequence.

11. An automatic cassette loading and reproducing apparatus according to claim 10; further comprising display means for displaying said coded information read from said memory means.

12. An automatic cassette loading and reproducing apparatus according to claim 10; in which said cassette reproducing means includes a plurality of cassette players each having a standby state in which a recorded cassette is loaded therein and made ready for the reproducing thereof and an operative state in which the recorded cassette previously loaded into the respective cassette player is reproduced by the latter; said control means is operative in said normal mode to cause said cassette transporting means to load recorded cassettes for normal use from respective locations in said main storage means into said plurality of cassette players in said predetermined sequence and then to hold said cassette players in said standby state until said cassette players are switched to said operative state for reproducing recorded cassettes therein in said predetermined sequence; and said control means is operative in said emergency mode to remove from one of said cassette players the recorded cassette for normal use which is last, according to said predetermined sequence, among the recorded cassettes then loaded in said cassette players and to load said recorded cassette for emergency use in place of the removed cassette and establish said standby state of the respective cassette player.

13. An automatic cassette loading and reproducing apparatus according to claim 12; further comprising means operative at will to establish said operative state of said respective cassette player in which said recorded cassette for emergency use is loaded and to suspend operation of the cassette player loaded with the recorded cassette for normal use which is then at the head of said predetermined sequence.

14. An automatic cassette loading and reproducing apparatus according to claim 13; in which said auxiliary storage means includes a plurality of storage bins each adapted to have placed therein and store a respective recorded cassette for emergency use, and sensing means associated with each of said storage bins for detecting the presence of a recorded cassette for emergency use in the respective storage bin.

15. An automatic cassette loading and reproducing apparatus according to claim 14; in which said control means responds to the detecting by said sensing means of the presence in the respective storage bin of a recorded cassette for emergency use so as to change-over from said normal mode to said emergency mode, and the apparatus remains in said emergency mode until each said recorded cassette for emergency use has been reproduced, whereupon said control means returns to said normal mode at the point in said predetermined sequence where an interruption occurred in the reproducing of the recorded cassettes for normal use.

16. An automatic cassette loading and reproducing apparatus according to claim 15; in which, when a plurality of said recorded cassettes for emergency use are stored in said bins of the auxiliary storage means, said control means causes reproducing of said recorded cassettes for emergency use in the order in which said recorded cassettes for emergency use have been placed in the respective bins.

* * * * *